United States Patent
Jagadish et al.

[11] Patent Number: 5,982,864
[45] Date of Patent: *Nov. 9, 1999

[54] TELEPHONE BILLING WITH CUSTOMIZED BILLING INFORMATION

[75] Inventors: Hosagrahar V. Jagadish; Inderpal S. Mumick, both of Berkeley Heights, N.J.

[73] Assignee: AT&T Corp, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/848,869

[22] Filed: May 1, 1997

[51] Int. Cl.⁶ .................................................. H04M 15/00
[52] U.S. Cl. ........................ 379/115; 379/114; 379/112; 379/127
[58] Field of Search ................................... 379/112, 114, 379/115, 116, 118, 120, 127, 144, 201, 142; 455/403, 405, 406, 407, 408, 415

[56] References Cited

U.S. PATENT DOCUMENTS

| | | |
|---|---|---|
| 4,979,207 | 12/1990 | Baum et al. . |
| 5,146,491 | 9/1992 | Silver et al. . |
| 5,206,899 | 4/1993 | Gupta et al. ............................. 379/114 |
| 5,222,125 | 6/1993 | Creswell et al. . |
| 5,291,543 | 3/1994 | Freese et al. . |
| 5,381,467 | 1/1995 | Rosinski et al. . |
| 5,384,831 | 1/1995 | Creswell et al. . |
| 5,450,477 | 9/1995 | Amarant et al. . |
| 5,506,893 | 4/1996 | Buscher et al. . |
| 5,544,229 | 8/1996 | Creswell et al. . |
| 5,553,131 | 9/1996 | Minervino, Jr. et al. . |
| 5,557,664 | 9/1996 | Burns et al. . |
| 5,568,541 | 10/1996 | Greene . |
| 5,577,101 | 11/1996 | Böhm . |
| 5,579,379 | 11/1996 | D'Amico et al. . |
| 5,581,607 | 12/1996 | Richardson, Jr. et al. . |
| 5,592,537 | 1/1997 | Moen . |
| 5,754,634 | 5/1998 | Kay et al. ................................ 379/113 |
| 5,844,972 | 12/1998 | Jagadish et al. ........................ 379/144 |

FOREIGN PATENT DOCUMENTS

WO 95/24093   9/1995   United Kingdom .

*Primary Examiner*—Curtis A. Kuntz
*Assistant Examiner*—Rexford N. Barnie

[57] ABSTRACT

A method and system for automatically generating telephone bills that include customer defined or requested billing information. Customer specific data including billing parameters for a customer is stored. A record describing a telephone call between the customer and a party is generated at a network switch. The record is received at a billing analysis system, the billing information relating to the party is determined using the record and at least one billing parameter and a telephone bill for the customer including billing information relating to the party is generated. In one embodiment of the present invention, customer specific data entries including at least one billing parameter and customer information are stored for each of a plurality of a customers and a telephone bill for the first customer including billing information relating to the second customer is generated based on a billing parameter for the first customer and customer information for the second customer. In another embodiment of the present invention, customer specific data including at least one billing parameter and caller information is stored for a customer and a telephone bill for the customer including billing information relating to the caller is generated based on a billing parameter and the caller information.

18 Claims, 4 Drawing Sheets

5,982,864

TELEPHONE BILLING WITH CUSTOMIZED BILLING INFORMATION

FIELD OF THE INVENTION

The present invention relates to the processing of telephone calls, and in particular, to the billing of the costs of such calls.

BACKGROUND OF THE INVENTION

Conventional telephone bills provide standard billing information, such as the telephone number of each party called, the time and date each call was made, and the duration and charge for each call. The customer who receives the bill has no control over the billing information presented and cannot define or request custom billing information. It would be useful if bills including the desired customer defined or requested billing information were automatically generated by the telephone billing process.

SUMMARY OF THE INVENTION

The present invention is a method and system for automatically generating telephone bills that include customer defined or requested billing information.

In order to bill for telephone service according to the present invention, customer specific data including billing parameters for a customer is stored. A record describing a telephone call between the customer and a party is generated at a network switch. The record is received at a billing analysis system, the billing information relating to the party is determined using the record and at least one billing parameter and a telephone bill for the customer including billing information relating to the party is generated.

In one embodiment of the present invention, customer specific data entries including at least one billing parameter and customer information are stored for each of a plurality of a customers. A record describing a telephone call from a first customer to a second customer at a network switch is generated. The record is received at a billing analysis system and a telephone bill for the first customer including billing information relating to the second customer is generated based on a billing parameter for the first customer and customer information for the second customer.

In another embodiment of the present invention, customer specific data including at least one billing parameter and caller information is stored for a customer. A record describing a telephone call from a caller to the customer is generated at a network switch. The record is received at a billing analysis system and a telephone bill for the customer including billing information relating to the caller is generated based on a billing parameter and the caller information.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1A:
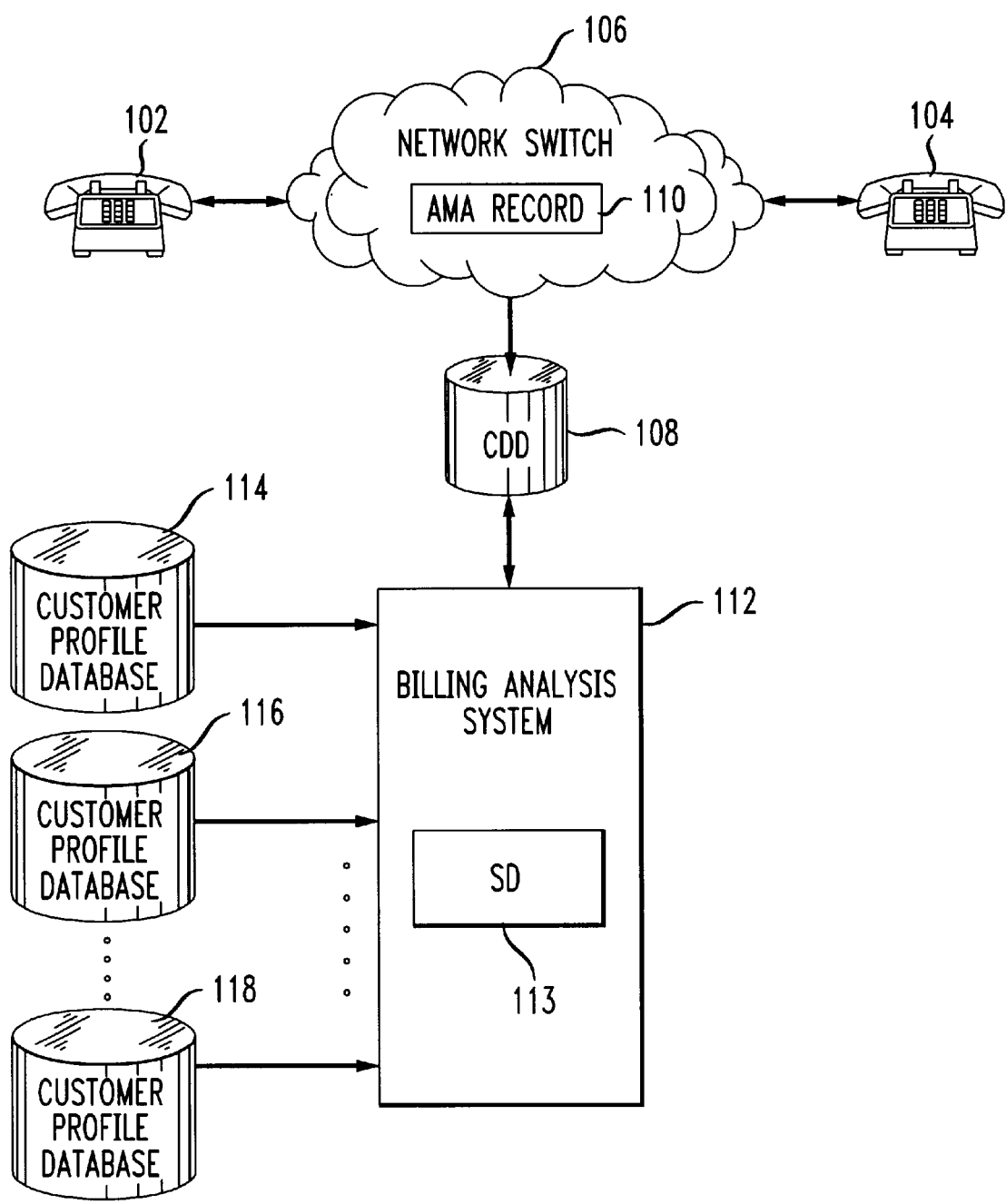
FIG. 1a is a block diagram of one embodiment a telephone call billing system, in which the present invention may be implemented.

Referring to FIG. 1a, there is shown a block diagram of a telephone system in accordance with one embodiment of the present invention. There is shown a calling telephone 102, a called telephone 104, a telephone network switch 106 and a Call Detail Database (CDD) 108. An Automatic Message Accounting (AMA) record, represented by a block 110, is also shown. As indicated by the figure, a billable call may be initiated at telephone 102 and routed through switch 106, e.g., an AT&T 4ESS® switch, to telephone 104. The switch generates AMA record 110, which includes the information necessary to rate the call. The AMA record is passed to CDD 108. It should be noted here that there are an abundance of protocols and transmission media that may be used for passing the data from the switch to the CDD. For example, suitable protocols include the well known File Transfer Protocol (FTP) and Transmission Control Protocol/Internet Protocol; and suitable transmission media include twisted shielded pair wires, fiber optic lines, coaxial cable, and wireless links. Moreover, these protocols and media are suitable for use in all data transfers and queries hereinafter described.

In any event, once the AMA record has been passed to the CDD, it is available for use in pricing the call. To this end, the AMA record is passed to a billing analysis system 112, which may be a general purpose computer capable of running the software necessary to implement the invention. The billing analysis system applies any customer specific billing parameters to the AMA record to produce a processed AMA record. It then passes both the AMA record and the processed AMA record back to the CDD for storage.

The billing analysis system performs its functions the instant the switch passes the AMA record to the CDD (i.e. it performs call pricing in real-time). In order to achieve real-time processing of AMA records the invention must overcome two primary obstacles. First, the customer specific data is fragmented across multiple business units, with no cohesive notion of an integrated customer profile. This situation is depicted in FIG. 1a, which shows several customer profile databases 114, 116 and 118. As shown in the figure, the invention overcomes this obstacle through the use of an integrated customer profile database located within the billing analysis system. Software tools update the integrated customer profile database in response to updates of the individual customer profiles 114, 116 and 118 so that the integrated database always contains current information on all customers.

The volume of customer and telephone call data makes it difficult to store, rate, and query call data in real-time. To surmount this obstacle the invention accumulates summary information as each individual call (AMA) record is received and rated in real-time. It is generally desirable for a telephone network to maintain a customer's current bill. Thus, one type of accumulated summary information may be current bills for each network customer. Nevertheless, it may be useful to accumulate other types of summary information for particular customers. The nature of the accumulated summary information for a particular customer depends upon the services subscribed to by that customer.

For example, a customer may subscribe to a plan in which calls made during the hours between 5:00 pm and 9:00 am receive a 10% discount; in which case it is useful to maintain a summary field containing the number of minutes of calls that the customer has made during the discount period.

In any case, the summary information is stored in a Summary Database (SD) 113 that is located within the billing analysis system. Thus, in this embodiment, AMA records and processed AMA records are stored in the CDD, while summary information is stored in the SD. Once summary information has been stored in SD 113, it is available for immediate access. It should be noted that many alternative storage schemes may be employed without departing from the spirit of the invention. For example, in one alternative scheme, AMA records are stored in the CDD, summary information are stored in the SD, and processed AMA records are stored in both the CDD and SD.

Figure 1B:
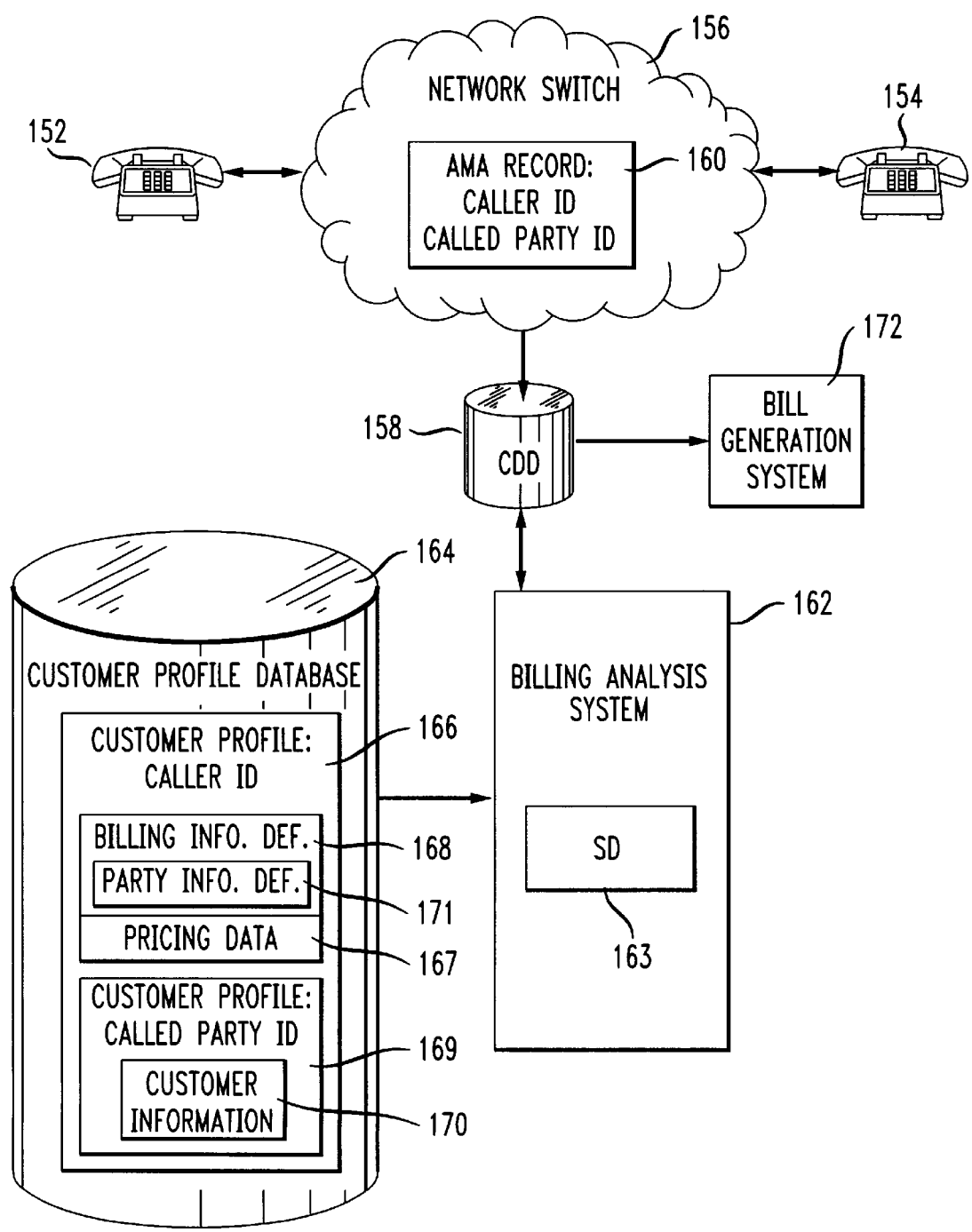
FIG. 1b is a block diagram of the telephone call billing system of FIG. 1a, showing a customer profile including billing parameters according to the present invention.

The processing involved in summary billing is shown in FIG. 1b, which, as an example, shows the present invention implemented in the telephone billing system of FIG. 1a. The present invention may be similarly implemented in the telephone billing systems shown in FIGS. 3 and 4.

A customer places calls from calling stations 152. Each call is routed through a network switch 156, which generates a corresponding AMA record 160. The AMA record includes an identifier of the party that placed the call, termed the caller ID. Typically the Automatic Number Identification (ANI) is used for this purpose. In an ANI system, the number of the telephone station from which a call is initiated is determined and used to identify the party who initiated the call. The AMA record also includes an identifier of the party to whom the call was placed, termed the called party ID. Typically, the dialed number is used for this purpose.

Each AMA record is passed to CDD 158, making the record available for call pricing. Each AMA record is passed from CDD 158 to billing analysis system 162, which applies the customer specific billing parameters contained in the attached customer profile database, such as database 164. The customer profile corresponding to the caller, profile 166, is accessed using the caller ID in AMA record 160. The billing analysis system 162 then generates updates to summary information stored in the summary database (SD) 163 based on the customer profile 166 stored in customer profile database 164. The updates to the summary information are generated in real-time as calls are placed and AMA records generated.

Customer profile 166 includes a caller ID, which is used to identify the customer to whom the profile corresponds and pricing data 167, which is used by billing analysis system 162 to generate a priced call value for the call. Customer profile 166 also includes billing information definition 168, which includes one or more billing parameters that specify the information that is to be generated and included on the customer's bill. As a default, billing information definition 168 may specify that conventional billing information is included on the bill. Customers may subscribe to billing services which provide semi-custom billing information or fully custom billing information may be provided. The billing parameters may be defined directly by the customer, or the billing parameters may be defined based on billing information requested by the customer.

Typically, billing information definition 168 includes billing parameters that specify information relating to the called party of the call that is to be included on the bill. For example, billing information definition 168 may include billing parameters that specify billing information such as the name and address of the called party, which is to be included on the bill.

In one embodiment, the specified billing information is obtained from one or more customer profiles corresponding to the called party. This embodiment is applicable to called parties who are also customers of the particular telephone carrier system, and thus, have defined customer profiles. Billing analysis system 162 accesses one or more customer profiles that correspond to the called party, such as customer profile 169, using the called party ID included in AMA record 160. Customer profile 169 includes customer information 170, from which the required information is extracted by billing analysis system 162. The extracted information is included with the priced call value in the processed AMA record that is generated by billing analysis system 162. The processed AMA record is then passed back to CDD 158 for storage.

In another embodiment, the specified billing information is obtained from billing parameters termed party information definitions, such as definition 171, that are included in the billing information definition. Party information definition 171 includes information identifying each specified called party, such as a called party ID, along with customer specified information, such as name and address, of called parties that are not customers of the particular telephone carrier system. Billing analysis system 162 accesses party information definition 171, using the called party ID, and extracts the required information from definition 171. The extracted information is included with the priced call value in the processed AMA record that is generated by billing analysis system 162. The processed AMA record is then passed back to CDD 158 for storage.

Party information definition 171 may also include information identifying callers whose call charges are paid by the customer. For example, a customer may have a calling plan in which callers may call the customer and enter a personal identification number (PIN), which causes the call to be billed to the customer rather than to the caller. Billing analysis system 162 accesses party information definition 171, using the PIN, and extracts the required information from definition 171. The extracted information is included with the priced call value in the processed AMA record that is generated by billing analysis system 162. The processed AMA record is then passed back to CDD 158 for storage.

Bills are generated by bill generation system 171 based on the processed AMA records stored in CDD 158 and on the summary information stored in SD 163. The bills include the information, such as called party name and address, that is included in the processed AMA records. Typically, bills are may be generated periodically, but bills may also be generated on a predetermined schedule, whenever the generated summary information reaches a predetermined threshold, or bills may be generated whenever desired.

Figure 2:
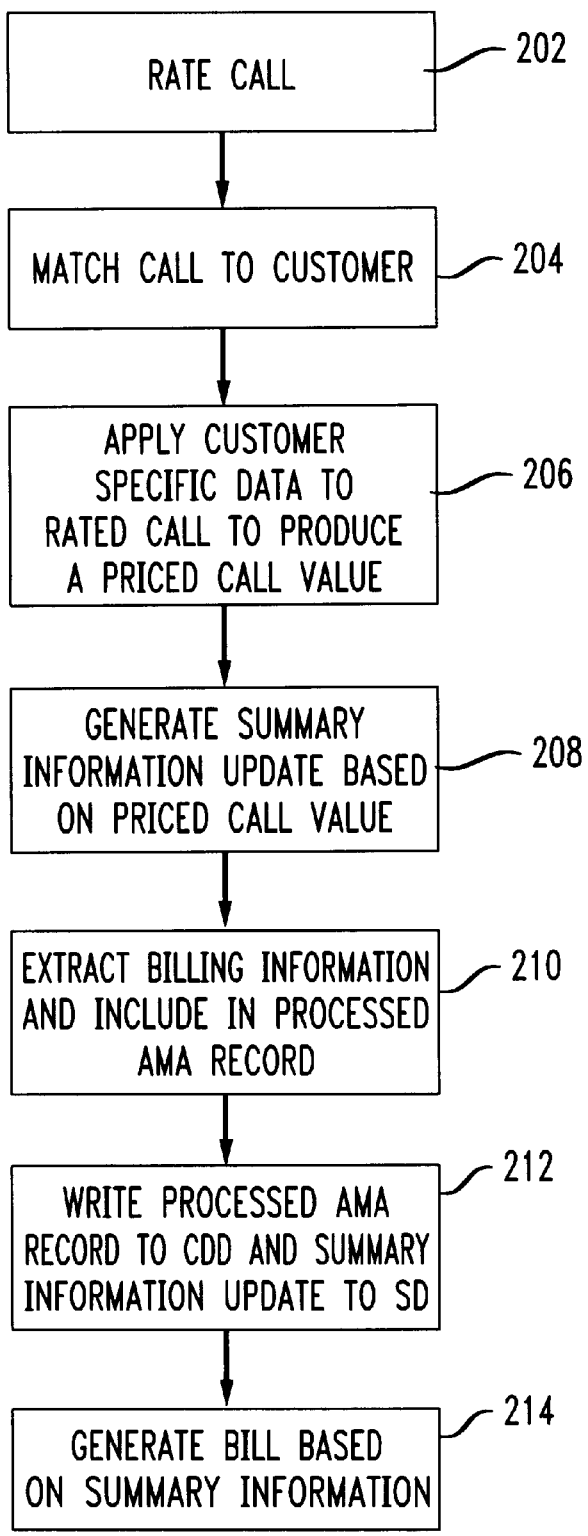
FIG. 2a is a flow diagram of the operation of a billing process according to the present invention.

FIG. 2 shows, in flowchart form, a procedure that a billing analysis system may use to perform summary billing processing for each call. In the following description of the flowchart references will be made to the embodiment shown in FIG. 1b.

Upon receiving an AMA record, such as 160a from CDD 158, the first step billing analysis system 162 takes is to rate the call (step 202). It must then match the rated call to the customer (step 204) so that customer specific parameters can be applied to the call. Several well known techniques can be used to match the rated call to the customer. One such technique uses Automatic Number Identification (ANI). In an ANI system, the number of the telephone station from which a call is initiated is determined and used to identify the party who initiated the call. Accordingly, in the FIG. 1b embodiment, the number of a telephone, such as 152a may be determined and passed to the billing analysis system along with the AMA record. The billing analysis system may then cross-reference the number to the customer profile containing the customer specific data to be used for the current call. For example, AMA record 160 is cross-referenced to customer profile 166, which also relates to that customer. Customer profile 166 contains customer specific pricing data 167 that is used to price the call, as well as billing information definitions that define the billing information that is to be included on the bill. Once the appropriate profile, or profiles, if there are multiple customer profile databases, have been determined, the billing analysis system applies the pricing data contained in the profiles to the rated call to produce a priced call value (step 206). The billing analysis system then generates summary information updates defined by the summary parameters based on the priced call value (step 208). The extracted billing information and the priced call value are included in the processed AMA record, (step 210), which is stored in the CDD and the summary information update for the customer is stored in the SD (step 212). As described in relation to FIG. 1a, an alternative scheme is to store both the priced call value and current bill—collectively termed "the priced call data"—in the SD; in which case, step 212 would involve storing the priced call value and the current bill in the SD. Finally, a bill is generated based on the summary information stored in the SD (step 214).

Figure 3:
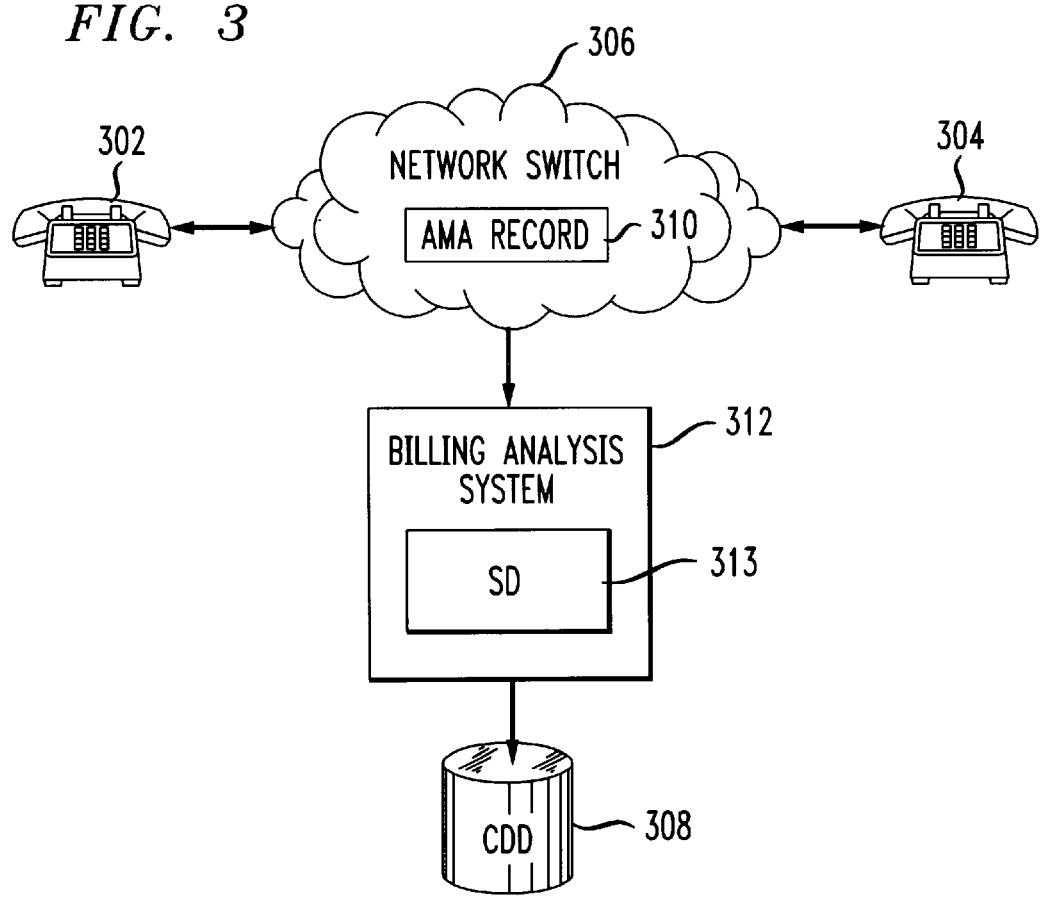
FIG. 3 is a block diagram of another embodiment a telephone call billing system, in which the present invention may be implemented.

Referring now to FIG. 3, there is shown an alternative embodiment of a telephone system in accordance with the present invention. The customer profiles are not shown, but are similar to those shown in FIG. 1b. As shown in the figure, a call may be initiated at a first telephone 302 and directed to a second telephone 304. The call is routed by a network switch 306, which generates an AMA record 310 for the call. The AMA record is passed to a billing analysis system 312 which applies customer specific pricing data to the AMA record to produce a processed AMA record. The AMA record and processed AMA record are then passed to a CDD 308 for storage.

Like the billing analysis system of FIG. 1b, the billing analysis system of FIG. 3 includes a SD 313. The billing analysis system of FIG. 3 also includes an integrated customer profile—although, it should be noted that for simplicity of presentation the individual customer profile databases and the bill generation system are not shown in FIG. 3, nor in the figures that follow. Also, like the billing analysis system of FIG. 1a, the billing analysis system of FIG. 3 accumulates summary information as each individual call record is received and rated in real-time, the summary information being stored in the SD 313. As in the prior described embodiment, alternative schemes may be employed for the storage of the AMA records, processed AMA records, and summary information.

Figure 4:
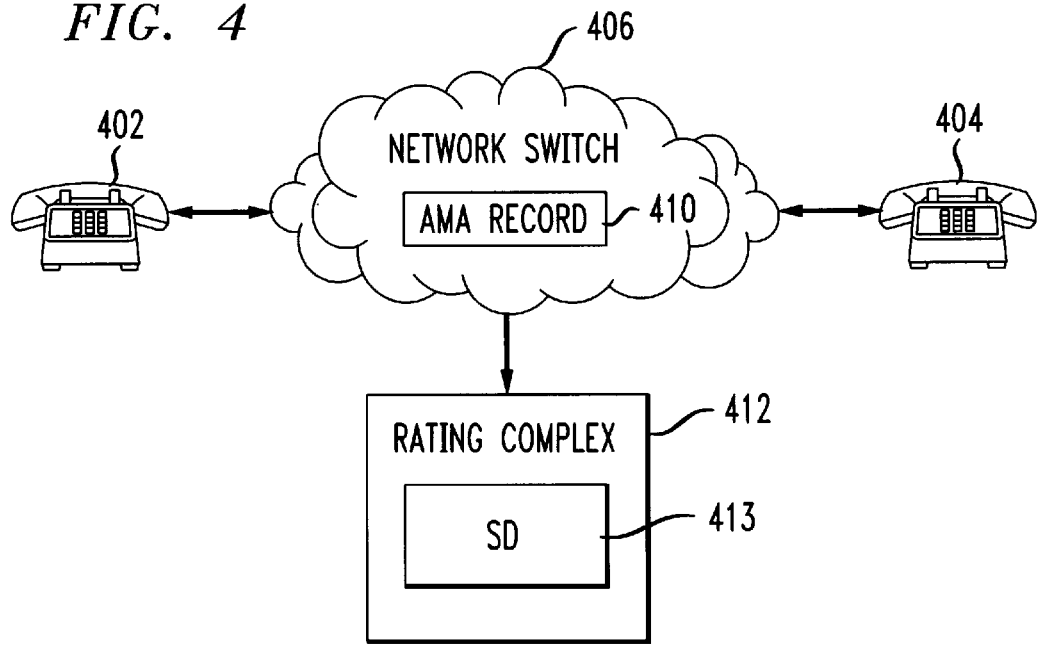
FIG. 4 is a block diagram of another embodiment a telephone call billing system, in which the present invention may be implemented.

FIG. 4 shows another embodiment of a telephone system in accordance with the present invention. The customer profiles are not shown, but are similar to those shown in FIG. 1b. In the FIG. 4 embodiment, as in the previous embodiments, a call initiated at a first telephone 402 may be directed to a second telephone 404 through a network switch 406, which generates an AMA record 410. However, in the FIG. 4 embodiment the AMA record is passed to a Rating Complex (RC) 412. The RC is a unit which performs the functions of the CDD and billing analysis system, and may therefore be characterized as a combined CDD and billing analysis system. As shown in the figure, the RC may include a SD 413 for storing the summary information separately from the AMA records and processed AMA records. As in the prior described embodiments, alternative schemes may be employed for the storage of the AMA records, processed AMA records, and summary information.

It should be noted that although all three embodiments discussed above depict a call as being initiated from a first telephone and directed to a second telephone, it is possible that calls may be initiated by, and directed to, many different types of communication devices. For example, a call may be initiated by a fax machine and directed to a personal computer. Moreover, a call may be initiated by a single communication device and directed to multiple communication devices. For example, a call may be initiated by a fax machine and directed to multiple independent personal computers. For purposes of this description, each instance of a single initiating call being directed to a different terminating device will be considered an independent call.

Although specific embodiments of the present invention have been described, it will be understood by those of skill in the art that there are other embodiments which are equivalent to the described embodiments. Accordingly, it is to be understood that the invention is not to be limited by the specific illustrated embodiments, but only by the scope of the appended claims.

What is claimed is:

1. A method of billing a customer for telephone service comprising the steps of:

storing customer specific data including billing parameters, the billing parameters specifying billing information that is to be generated for inclusion on a customer bill, for a customer;

generating a record describing a telephone call from the customer to a party at a network switch, the record including an identifier of the party;

receiving the record at a billing analysis system;

accessing stored information relating to the party using the identifier of the party; and extracting information specified by the billing parameters from the stored information;

generating billing information relating to the party using the record, the information generated as specified by the billing parameters; and generating a telephone bill for the customer including the generated billing information.

2. The method of claim 1, wherein the customer places the call to the party and the identifier of the party is the automatic number identification of the party.

3. The method of claim 1, wherein the party places a call to the customer and the identifier of the party is a personal identification number associated with the party.

4. A method of billing for telephone service comprising the steps of:

storing customer specific data entries including at least one billing parameter specifying billing information that is to be generated for inclusion on a customer bill and customer information, for each of a plurality of a customers;

generating a record describing a telephone call from a first customer to a second customer at a network switch, the record including an identifier of the first customer and an identifier of the second customer;

receiving the record at a billing analysis system;

accessing a customer specific data entry for the first customer using the identifier of the first customer;

obtaining the billing parameter from the customer specific data entry for the first customer;

accessing a customer specific data entry for the second customer using the identifier of the second customer;

extracting information specified by the billing parameter from the customer specific data entry for the second customer; and generating a bill for the first customer including the extracted information relating to the second customer.

5. The method of claim 4, wherein the identifier of the first customer is an automatic number identification for the first customer.

6. The method of claim 5, wherein the identifier of the second customer is a dialed number for the second customer.

7. A system for billing a customer for telephone service comprising the steps of:

a database storing customer specific data including billing parameters, the billing parameters specifying billing information that is to be generated for inclusion on a customer bill, for a customer;

a network switch generating a record describing a telephone call from the customer to a party at a network switch, record including an identifier of the party;

a billing analysis system receiving the record, accessing the database to obtain the customer specific data, accessing stored information relating to the party using the identifier of the party, extracting information specified by the billing parameter from the stored information, generating billing information relating to the party using the record, the information generated as specified by the billing parameters, and generates a telephone bill for the customer including billing information relating to the party.

8. The system of claim 7, wherein the customer places the call to the party and the identifier of the party is the automatic number identification of the party.

9. The system of claim 7, wherein the party places a call to the customer and the identifier of the party is a personal identification number associated with the party.

10. A system for billing for telephone service comprising the steps of:

a database storing customer specific data entries including at least one billing parameter specifying billing information that is to be generated for inclusion on a customer bill and customer information, for each of a plurality of a customers;

a network switch generating a record describing a telephone call from a first customer to a second customer;

a billing analysis system receiving the record, accessing a customer specific data entry for the first customer using the identifier of the first customer, accessing a customer specific data entry for the second customer using the identifier of the second customer, obtaining the billing parameter from the customer specific data entry for the first customer, extracting information specified by the billing parameter from the customer specific data entry for the second customer, and generating a bill for the customer including the extracted information relating to the second customer.

11. The system of claim 10, wherein the identifier of the first customer is an automatic number identification for the first customer.

12. The system of claim 11, wherein the identifier of the second customer is a dialed number for the second customer.

13. A system for billing a customer for telephone service comprising:

means for storing customer specific data including billing parameters, the billing parameters specifying billing information that is to be generated for inclusion on a customer bill, for a customer;

means for generating a record describing a telephone call from the customer to a party, including an identifier of the party;

means for accessing stored information relating to the party using the identifier of the party;

means for extracting information specified by the billing parameter from the stored information;

means for generating billing information relating to the party using the record, the information generated as specified by the billing parameters; and means for generating a telephone bill for the customer including billing information relating to the party.

14. The system of claim 13, wherein the customer places the call to the party and the identifier of the party is the automatic number identification of the party.

15. The system of claim 13, wherein the party places a call to the customer and the identifier of the party is a personal identification number associated with the party.

16. A system for billing for telephone service comprising:

means for storing customer specific data entries including at least one billing parameter specifying billing information that is to be generated for inclusion on a customer bill and customer information, for each of a plurality of a customers;

means for generating a record describing a telephone call from a first customer to a second customer, the record including an identifier of the first customer and an identifier of the second customer;

means for accessing a customer specific data entry for the first customer using the identifier of the first customer, and means for accessing a customer specific data entry for the second customer using the identifier of the second customer;

means for obtaining the billing parameter from the customer specific data entry for the first customer, means for extracting information specified by the billing parameter from the customer specific data entry for the second customer, and means for generating a bill for the first customer including the extracted information relating to the second customer.

17. The system of claim 16, wherein the identifier of the first customer is an automatic number identification for the first customer.

18. The system of claim 17, wherein the identifier of the second customer is a dialed number for the second customer.

* * * * *